Jan. 10, 1967 G. M. RAPATA 3,297,849
CONTACT ASSEMBLY FOR SWITCHING OPERATIONS
Filed July 15, 1964 3 Sheets-Sheet 1
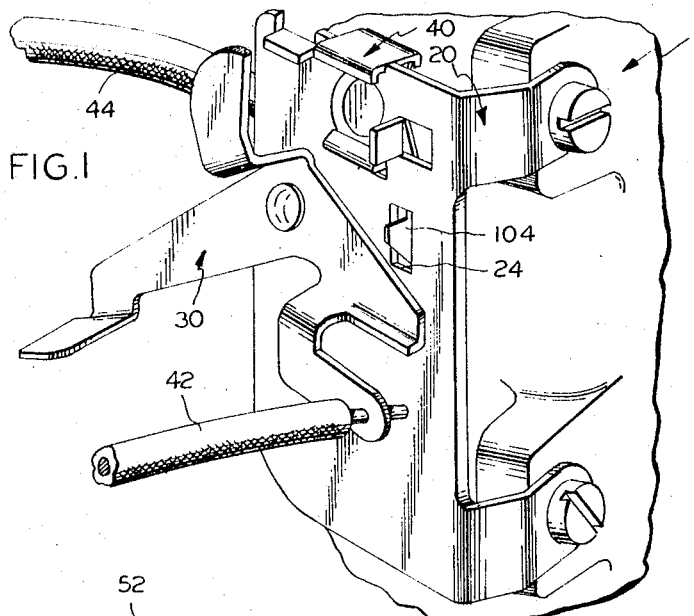
FIG.1
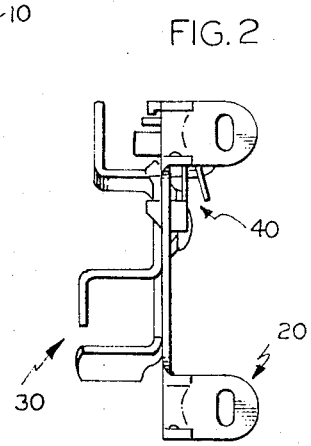
FIG.2
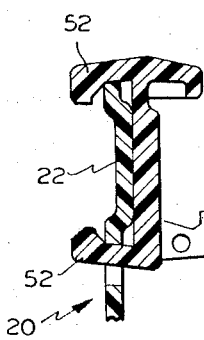
FIG.4
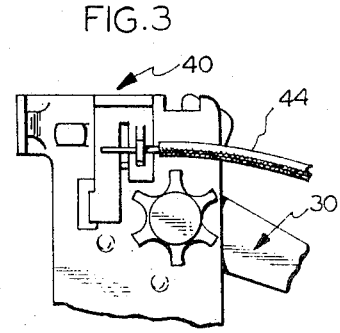
FIG.3
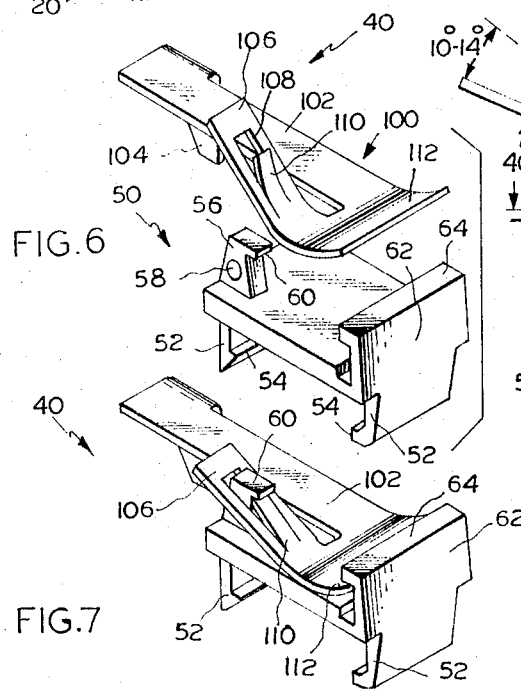
FIG.6
FIG.7
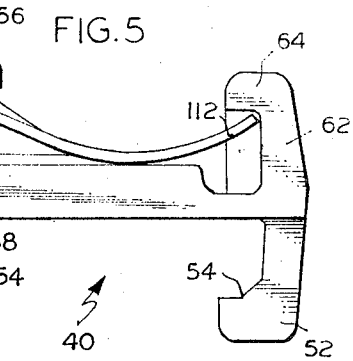
FIG.5
INVENTOR.
George M. Rapata
BY 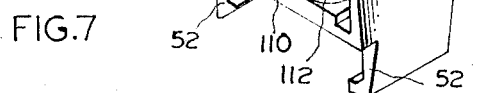
His Att'y Jan. 10, 1967 G. M. RAPATA 3,297,849
CONTACT ASSEMBLY FOR SWITCHING OPERATIONS
Filed July 15, 1964 3 Sheets-Sheet 2
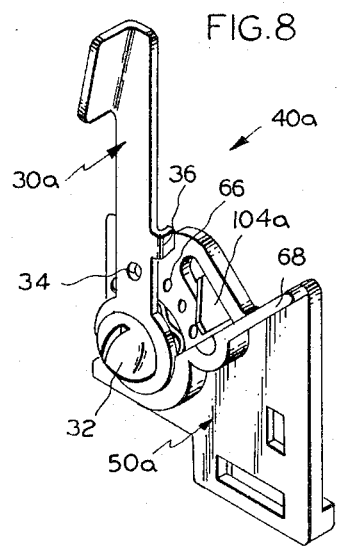
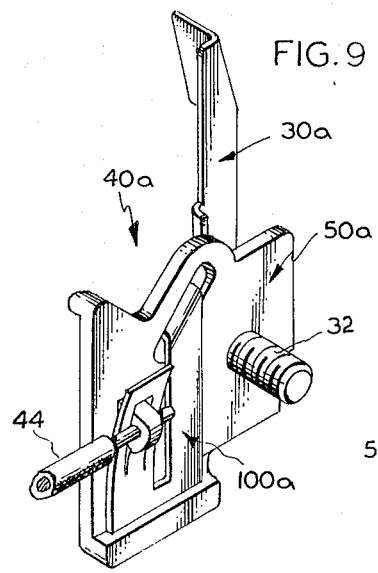
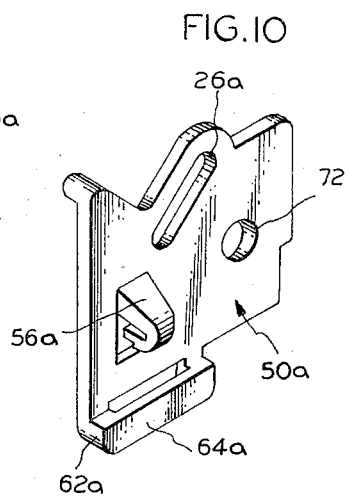
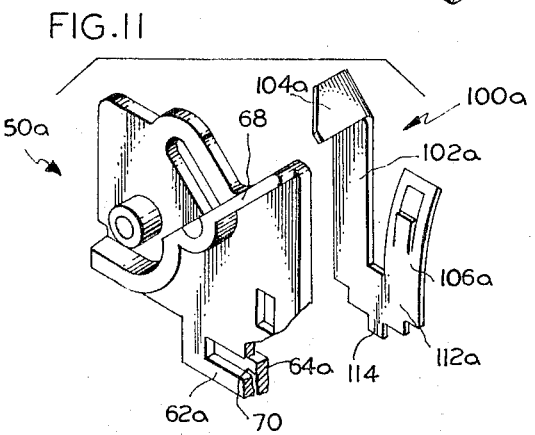
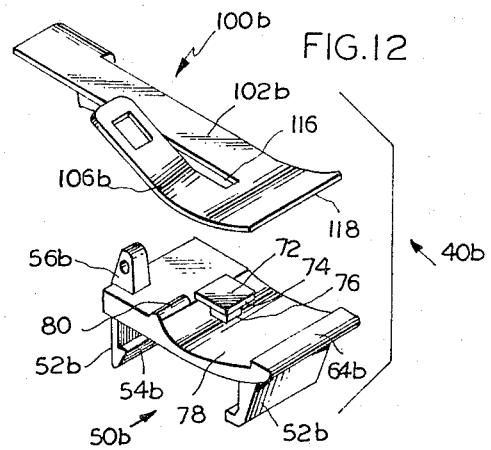
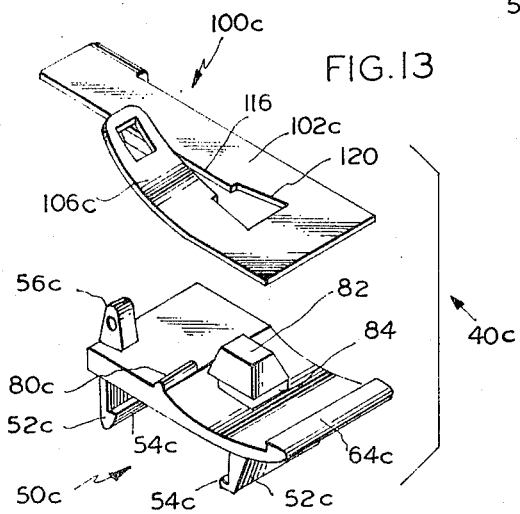
INVENTOR.
George M. Rapata
BY
His Att'y Jan. 10, 1967 G. M. RAPATA 3,297,849
CONTACT ASSEMBLY FOR SWITCHING OPERATIONS
Filed July 15, 1964 3 Sheets-Sheet 3
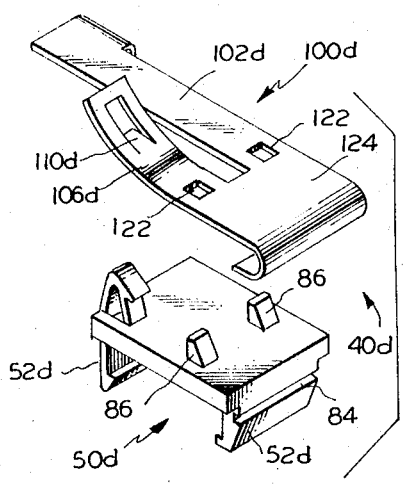
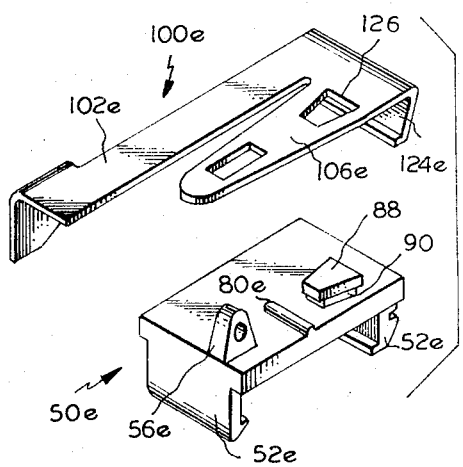
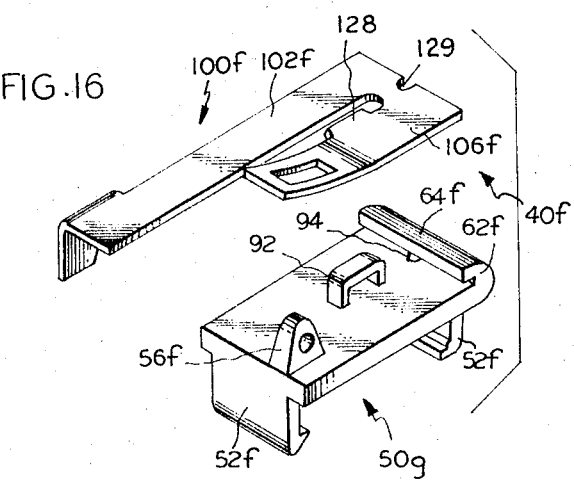
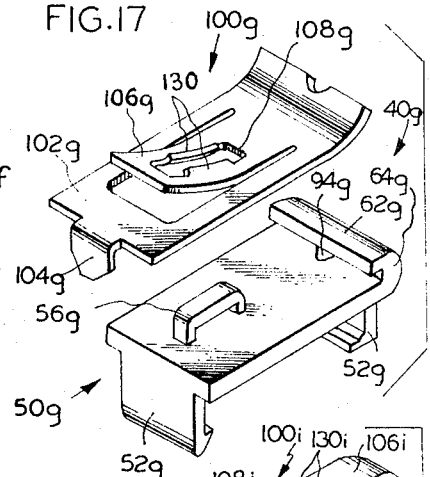
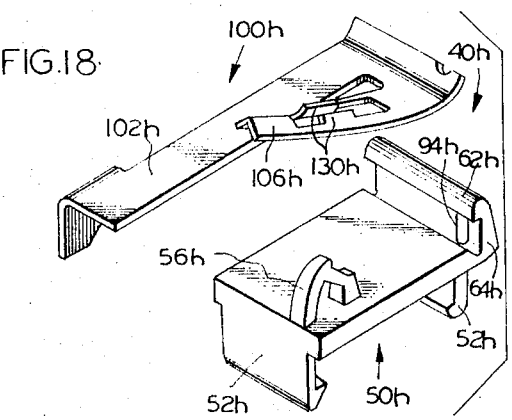
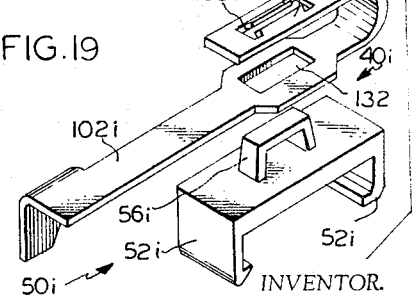
INVENTOR.
George M. Rapata
BY
His Att'y United States Patent Office 3,297,849
Patented Jan. 10, 1967

3,297,849
CONTACT ASSEMBLY FOR SWITCHING
OPERATIONS
George M. Rapata, Park Ridge, Ill., assignor to Illinois
Tool Works Inc., Chicago, Ill., a corporation of Delaware
Filed July 15, 1964, Ser. No. 382,718
18 Claims. (Cl. 200—166)

This invention relates to control devices for electrical circuits, and more specifically to a contact assembly for switching operations which is particularly useful for stopping an engine by electrically shorting the primary side of an ignition coil to engine ground.

Small gasoline engines, such as those used with lawn mowers, boats and the like, are normally provided with means to stop its operation. This is normally accomplished by a contact assembly or switching mechanism which establishes an electrical path to engine ground for the high voltage side of a spark coil controlling the ignition of the gas vapors, and thus the engine operation. In some instances, this switching mechanism is operated independently of other engine controls; however, in its most desirable form, this switching element is operated by the throttle control lever which regulates the amount of fuel admitted to the engine. Stop switch mechanisms which are incorporated or operated by the throttle control lever are preferably positioned relative to the lever so that they are actuated when the engine is operating at its lowest speed to reduce wear and possible injury to the engine.

The prior art is replete with many kinds of switch devices which are operated by a mechanical actuator such as a lever, but these devices are, in most cases, relatively complex and require a great number of parts. It has also been found that fastening techniques employed to attach or connect a wire conductor to these switch mechanisms have not always been satisfactory. In addition, the assembly, the assembly of the components of the switch to each other as well as the assembly of the switch itself to a support has been tedious and time consuming, and has created problems in the replacement of the switch components. The present invention overcomes these and other prior art deficiencies in the provision of a novel and unique stop switch mechanism which is peculiarily, although not exclusively, designed for use with a throttle control lever of small gasoline engines.

Accordingly, it is an object of the present invention to provide a highly reliable switching devices which is simple in construction, and made of a minimum number of parts.

More specifically, it is an object of the present invention to provide a novel and unique two-piece contact assembly or switch mechanism which is insulated from ground, and contacted by a grounded throttle control lever of a gasoline engine or the like for stopping the same.

Another object of the present invention is the provision of a novel and unique stop switch which releasably, but securely retains switch components to each other as well as assuring the assembly of the switch itself to a support.

In particular, it is an object of the present invention to provide a stop switch mechanism wherein the switch components are assembled to each other without additional fastening means, and wherein the switch itself can be securely mounted to a support with or without additional fastening means.

A still further object of the present invention is the provision of a novel and unique stop switch mechanism which facilitates and improves the connection of a wire conductor to the same.

Still another object of the present invention is to provide a stop switch mechanism which, in addition to the aforementioned objects, is long lasting, substantially corrosive-resistant, and economical to produce at a low cost under mass manufacturing techniques.

Other objects and advantages will become apparent from the following description when taken in conjunction with the accompanying drawings wherein:

FIG. 1 is a perspective view of a stop switch assembly as mounted on an engine block;

FIG. 2 is an elevational view of the stop switch assembly shown in FIG. 1;

FIG. 3 is a fragmentary bottom plan view of the stop switch assembly shown in FIGS. 1–2;

FIG. 4 is a partial sectional view illustrating a manner in which the stop switch is assembled to a panel or support;

FIG. 5 is an enlarged front elevational view of one form of stop switch constructed in accordance with the principles of the present invention;

FIG. 6 is an exploded perspective view showing the two components of the stop switch device illustrated in FIG. 5;

FIG. 7 is a perspective view of the stop switch shown in FIGS. 5–6 with the two switch components assembled to one another;

FIG. 8 is a perspective view of another form of stop switch device constructed in accordance with the present invention;

FIG. 9 is a perspective view of the stop switch device shown in FIG. 8 as viewed on the bottom thereof;

FIG. 10 is a perspective view of one of the components of the stop switch shown in FIGS. 8–9;

FIG. 11 is an exploded perspective view of the form of stop switch shown in FIGS. 8–9 with a slight variation thereof; and FIGS. 12–19 are exploded perspective views of yet still other forms of stop switch devices coming within the purview of the present invention.

The stop switch device or mechanism shown in the various figures of the drawings has been enlarged to facilitate an understanding of the construction and operation of the same, and in reality, is approximately one-half the size shown in the drawings.

Referring now in greater detail to the drawings, it will be seen that only a part of the engine block 10 has been shown in FIG. 1 so as to pinpoint the discussion on the stop switch device of the present invention. Attached to the engine block 10 is a bracket 20 which pivotally supports a lever 30 which may also be used as a throttle control if desired. The stop switch device 40 of the present invention is secured to the bracket 20 in a manner which will permit the lever 30 to contact the electrically conductive portion of the stop switch device for completing a circuit to ground for the low voltage side of a spark coil operating the motor to stop its operation. It will be apparent from an inspection of FIG. 1 that the wire segment 44 connected to the lever 30, and an electrically conductive portion of the stop switch 40 respectively, is part of the circuit which establishes an electrical path to ground.

As best seen in FIGS. 5–7, the stop switch device 40, which is one of the forms of the present invention is composed of a switch body 50 made in one piece from a thermoplastic insulating material such as nylon, and an electrical contact or stamping 100, preferably made of a phosphor-bronze combination. The switch body 50 has a pair of opposed deflectable bracket or panel engaging prongs 52 having inwardly directed shoulders 54 at the free ends thereof. These prongs are adapted to be spread apart from each other when forced into engagement with a bracket or panel strip portion 22 so as to releasably secure the switch body to the bracket or panel. When the prongs 52 have been forced over the panel strip portion, the inwardly directed shoulders 54 thereof will be positioned for abutting engagement with the panel to prevent removal of the switch. It is preferable, though not necessary, that the panel strip portion to which the switch body is secured be located adjacent one of the margins of the bracket 20 as illustrated in FIG. 1 of the drawings.

Extending from the switch body in a direction generally opposite to the panel engaging prongs 52 is a wire receiving member 56 which is in the form of an upstanding ear integrally attached to the switch body adjacent one end. The wire receiving member or upstanding ear 56 is provided with a transversely extending passageway 58 for receiving a wire conductor such as that indicated by reference numeral 44 in FIGS. 1 and 3. Adjacent the free extremity of the upstanding ear, there is provided an overhanging ledge 60 which cooperates with the stamping 100 in securing the switch components to each other as will become apparent. An elongated protuberance 62 projects from the switch body in spaced relation to the upstanding ear, and has a hooked end portion 64 which engages a part of the stamping 100 to maintain the switch components in operative relationship as will also become apparent.

The phosphor-bronze stamping 100 has spaced first and second spring finger portions 102, 106 respectively which are integrally joined together at one end. At the opposite end of the first spring finger 102, there is provided a depending element 104 for engagement by the pivotally mounted lever 30 of the switch assembly. As will be observed from an inspection of FIG. 1, this element 104 projects through an opening 24 formed in the bracket or panel 20 so as to be readily engageable by the lever 30.

The wire conductor 44 is connected to the stamping 100 through the second spring finger 106 which is generally spaced upwardly from the plane containing the first spring finger by an angle of approximately 30°. The second spring finger 106 has an aperture 108 of a size which will accept the upstanding ear 56 of the switch body. As best seen in FIG. 5, this upwardly inclined spring finger will normally rest above the passageway 58 of the upstanding ear, but is capable of being deflected below the passageway for gripping and retaining a wire positioned therein. Since the second spring finger 106 is resiliently biased upwardly, it has a tendency to return to its initial position when it is deflected below the passageway 58, and thus acts to grip and retain a wire positioned within the passageway 58 to withstand a prescribed pull out strength. For example, the second spring finger 106, in its cooperation with the upstanding ear 56, is capable of retaining a wire of .032 diameter against a .75 lb. pull without slippage in either direction.

In order to secure the stamping 100 to the switch body 50, means have been provided which will retain the stamping to the switch body throughout all its movements. The particular type of assembly means associated with the FIGS. 1–7 embodiment generally comprises a resilient tab 110 which engages beneath the overhanging ledge 60 of the upstanding ear, and an upwardly inclined resilient portion 112 adjacent the end of the stamping at which the first and second fingers are integrally joined for reception beneath the hooked end portion 64 of the elongated protuberance 62. The resilient tab 110 is struck from the second spring finger 106 adjacent a marginal area of the aperture 108 formed therein, and is angularly offset from the second spring finger by an angle of no more than 10–14°. The angular relationship established between the resilient tab and the second spring finger is an important feature of the present invention since it has been found that when such a resilient tab engages beneath the overhanging ledge 60 of the upstanding ear, a reactive force against and in a direction substantially normal to the second spring finger will be established, such as shown by the arrow in FIG. 5 of the drawings, to aid in maintaining the switch components in operative relationship. Cooperating with this just described switch component assembly means is the upwardly inclined resilient portion 112 of the stamping 100 which engages the hooked end 64 of the elongated protuberance 62 and prevents shifting of the components.

In assembling the stamping 100 to the switch body 50, the upwardly inclined portion 112 is positioned beneath the hooked end 64 of the elongated switch body protuberance with the aperture 108 of the second spring finger aligned with the upstanding ear 56 of the switch body. When this has been accomplished, the second spring finger 106 is positioned over the upstanding ear 56 in order to permit the resilient tab 110 to engage the overhanging ledge 60. In this manner, the switch components will be releasably, but securely retained to one another without additional fastening elements. When it is desired to assemble the stop switch 40 to the bracket or panel 20 and connect the same in an electrical circuit to ground, the deflectable panel engaging prongs are forced over the panel strip portion 22 until the inwardly directed shoulders 54 thereof are positioned in close proximity to one face of the bracket or panel for preventing withdrawal of the switch. Then, it is a relatively simple matter to deflect the second spring finger 106 below the passageway 58 in the upstanding ear 56, insert a wire conductor in this passageway, and thereafter release the second spring finger to allow the same to grip and retain a wire conductor positioned within the passageway. When it is desired to stop an engine or the like, the lever 30, which is connected in the circuit to ground, is pivoted on its axis into engagement with the depending element 104 of the first spring finger 102 to complete the circuit through the low voltage side of the coil to stop the engine.

The stop switch embodiment just described is one of many forms contemplated by the present invention. There are several forms of the present invention to be presently described which are illustrative of numerous modifications and structural variations of the herein disclosed stop switch, but which are not to be considered as the only forms coming within the purview of the present invention. The other forms of the stop switch disclosed herein are illustrated in FIGS. 8–19 of the drawings.

It is to be noted that the various embodiments shown in FIGS. 8–19 are generally similar to the stop switch embodiment illustrated in FIGS. 1–7 of the drawings, and that in describing the embodiments of FIGS. 8–19, suffixes "a" through "i" will be employed to designate like parts. Thus, it will be found that parts having no suffix in these figures will be an addition to previously discussed structure.

The stop switch embodiment shown in FIGS. 8–11 of the drawings is generally identified by reference numeral 40a, and consists of a switch body 50a and an electrically conductive stamping 100a. It will be noted that there are no panel engaging prongs in this embodiment, but that instead, a screw threaded fastener 34 pivotally mounts the lever 30a to the switch body, and is used for fixedly mounting the stop switch to the bracket or panel. The shank of the screw threaded fastener will be received within the complementary shaped aperture 72 formed in the switch body. The portion of the shank adjacent the head of the fastener will have no threads formed thereon in order to permit the lever 30a to pivot into engagement with the depending element of the first spring finger. If desired, it is possible to deform or otherwise provide a nub 34 on the lever 30a which will be received within complementary shaped openings 66 arranged in arcuate fashion on the switch body to provide selective movement for the lever. It is also possible to provide a lever stop 68 on the switch body to assure engagement with the depending element 104a of the first spring finger in only one direction.

The manner of attaching a wire conductor to the switch and for creating a reactive force against and substantially normal to the second spring finger 106a is accomplished in generally the same manner as the FIGS. 1–7 embodiment. However, it is to be noted that the connecting or additional assembly means of this embodiment differs primarily in that a depending lug 114 extends from the upwardly inclined portion 112a of the stamping and will be received within the complementary shaped recess 74 formed in the upstanding elongated protuberance 62a of the switch body. Increased retention power of the stamping to the switch body is the chief advantage of this construction.

In FIG. 12 of the drawings, another embodiment of the stop switch is illustrated and is generally designated by the reference numeral 40b. This form differs primarily in the provision of a boss element 72 having an undercut shoulder 74 which engages both finger portions 102b, 106b of the stamping 100b. The shank portion 76 of the boss element 72 will be received within the slot 116 formed in the stamping as a result of the spacing of the first and second finger portions. Since the undercut shoulder 74 of the boss element is wider than the slot in at least a transverse direction, it will thus engage both of the finger portions to assemble the stamping to the switch body. The best mode of assembly the stamping to the switch body in this embodiment is accomplished by aligning the shank portion 76 of the boss element with the slot 116 extending between the finger portions of the stamping, and then relatively moving the parts until the shank portion reaches the end of the slot.

The sliding movement of the parts relative to one another is facilitated by eliminating the hooked end portion of the upstanding elongated protuberance 64b. It is possible, however, to provide a snap fit between the edge 118 of the stamping and the elongated protuberance 64b for cooperation with the boss element 72b in maintaining the parts in operative relationship as well as eliminating retrograde movement of the stamping relative to the switch body. The assembly of the parts is also facilitated by the curved recess 78 formed in the switch body as will be apparent. To insure that the second spring finger 106 is normally positioned above the passageway formed in the upstanding ear 56b, an elongated ridge 80 may be provided on the switch body for engaging the undersurface of the second spring finger to position the same in its desired location. In addition, this elongated ridge 80 will improve the wire gripping ability of the second spring finger over an extended period of usage.

The stop switch embodiment illustrated in FIG. 13 of the drawings and designated 40c is generally similar to the FIG. 12 embodiment except that the boss element 82 has a slightly different configuration for cooperation with a complementary shaped recess 120 formed between the spaced fingers 102c, 106c of the stamping 100c. In this form, it is not possible to assemble the switch components in a sliding fashion since the shank portion 84 of the boss element 82 is substantially greater than the slot 116 formed between the fingers. Moreover, it is to be noted that since the shank portion 84 is the only part of the boss element which has a configuration complementary to that of the recess 120 formed in the stamping, it will be necessary to spread the spring fingers 102c, 106c apart from each other until the recess 120 is larger than the boss element 82 so that it will be possible to assemble the components to each other.

In FIG. 14, the stop switch designated 40d is provided with a pair of wedge elements 86 on the switch body 50d for cooperation with a pair of complementary shaped recesses 122 formed in each of the finger portions. The recesses 122 are so located in the stamping 100d that they will be contacted by the wedge elements 82 to prevent shifting of the switch components. It will also be observed that the stamping 100d is provided with an arm 124 which extends substantially normal to at least the first spring finger 102, and has an inwardly directed abutment 126 at the free end thereof which extends generally in the same direction as the first spring finger. This inwardly directed abutment 126 will be snapped into the recess 84 of the switch body to further enhance the switch retention ability of the panel engaging prongs 52d.

The form of stop switch shown in FIG. 15 designated 40e is generally similar to the FIG. 14 embodiment except that there is only a single slot 126 of dovetail shape formed in the second spring finger 106 which cooperates with and is received by a dovetailed boss or post element 88 having an undercut shoulder 90 similar to the bosses shown in FIGS. 12–13. In this form, the size of the dovetailed slot 126 is slightly greater than the largest portion of the dovetailed post 88 so that when the switch components are assembled, at least a portion of the marginal areas surrounding the slot 126 will be positioned for engagement with the undercut shoulder 90 of the dovetailed post 88. Relatively shifting the switch components after the slot 126 of the stamping is received by the dovetailed post 88 will cause marginal areas surrounding the slot 126 to be engaged by the undercut shoulder 90 for assembling the components to each other. This particular engagement is facilitated by the fact that the second spring finger 106e is initially coplanar with the first spring finger 102e, and that when the switch components are assembled, the second spring finger will be deflected upwardly from the first spring finger to reduce the slot 126 to a smaller size.

The stop switch designated 40f in FIG. 16 is generally similar to other embodiments except for the provision of a resilient tab 128 extending from the second spring finger 106f and into the space between the two fingers. This resilient tab 128 is adapted to be received by an upstanding U-shaped member 92 extending in generally the same direction as the upstanding ear 56f and the elongated protuberance 62f to impart the reactive force against the second spring finger as in the other embodiments. In addition, a post 94 extends between the switch body and the hooked end portion 64f of the elongated protuberance for reception within the notch 129 of the stamping 100f to resist lateral movement of the switch components relative to one another.

The form of stop switch designated 40g in FIG. 17 is also provided with a post and notch construction in the switch body and stamping respectively as the FIG. 16 embodiment, but in this case, the upstanding ear 56g has a U-shaped configuration. The stamping 100g also has a slightly modified construction as will be apparent from an inspection of FIG. 17. In this case, it will be noted that the second spring finger 106g is struck from the remainder of the stamping which constitutes the first spring finger 102g. A pair of opposed tabs 130 are in turn struck from the second spring finger in a marginal area surrounding the aperture 108g, and have a dimension between the free ends thereof in nondeflected position which is less than a transverse dimension of the upstanding ear so as to facilitate the reception and retention within the passageway thereof. The upward inclined resilient tabs 130 will provide the reactive force substantially normal and against the second spring finger 106g when they are received within the passageway of the upstanding ear or when they engage the lower face of the wire positioned therein, and will also act to grip the wire in a more secure fashion than in the previous embodiments as will be apparent.

The stop switch designated 40h in FIG. 18 not only has the post and notch construction in the switch body and stamping respectively as in the FIGS. 16–17 embodiments, and the opposed resilient tabs 130h as in the FIG. 17 embodiment, but also is provided with a substantially concavo-convex construction for the second spring finger 106h. The particular construction of the second spring finger in this embodiment aids in rigidifying the finger and its associated tabs, increases the height of the opposed resilient tabs 130h for improving their wire gripping ability, and provides a stop to limit the downward movement of the second finger relative to the switch body 50h. It will be apparent that the upstanding ear 56h is slightly modified over the previous construction, but this is for the purpose of accommodating the second spring finger 106h.

The stop switch designated 40i in FIG. 19 is different from the previous embodiments in that the second spring finger 106i is vertically spaced and overlies the first spring finger 102i. In addition, there is only an upstanding ear 56i of U-shaped construction projecting upwardly from the switch body. At first sight, it might seem that with the elimination of the elongated protuberance or other corresponding structure, this form would not operate in the same manner as the other embodiments; however, upon closer inspection it will be apparent that this doubling over of the fingers to provide aligned apertures 108i in the second finger and 132 in the first finger will nevertheless insure the assembly of the switch components to one another. The opposed resilient tabs 130i will be received within the passageway of the upstanding ear 56i during assembly, and thereafter engage the wire conductor in the same manner as the FIGS. 17–18 embodiments so as to provide the reactive force against and substantially normal to the second spring finger for aiding in maintaining the switch components together. And since the first spring finger 102i is also retained by the upstanding ear 56i, a relatively secure, but releasable connection between the components will be provided.

From the foregoing description, it will now be apparent that the stop switch of the present invention will insure the assembly of the switch components by providing means serving to impart a reactive force against and substantially normal to the second spring finger of the stamping, and an additional connecting means which cooperates with the means imparting a reactive force to provide a relatively trouble-free assembly. In FIGS. 1–11, 14 and 17–19, the means imparting a reactive force against and substantially normal to the second spring finger comprises either a single tab or a pair of opposed tabs which cooperate with the upstanding ear for aiding in maintaining the switch components assembled to one another. However, it is to be noted that FIGS. 12–13 and 15–16 indicate that such a reactive force may be provided by other structure associated with the stamping and switch body. It is also to be noted that in all of the forms of the invention disclosed herein, there is preferably provided a second assembly means between the stamping and switch body which acts to maintain the components together, and which cooperates with the means imparting the reactive force against the second spring finger to prevent disassembly of the components.

While the preferred embodiments of the present invention have been shown and described herein, it is obvious that many structural details may be changed without departing from the spirit and scope of the appended claims.

What is claimed is:

1. A contact assembly comprising body means made of insulating material including means for fixedly mounting the same to a support structure, an integral wire receiving member extending from said switch body means including a transversely extending aperture for receiving an electrically conductive wire member, electrical contact means mounted on said body means and including first and second portions, said first portion having one end thereof adapted to be positioned in close proximity to an electrically conductive actuator, said second portion being resiliently spaced upwardly from said first portion and having an opening slightly larger than said wire receiving member for accepting the same, said second portion capable of being positioned beneath an electrically conductive wire member accepted by the wire receiving member and being normally urged upwardly therefrom to enable marginal portions surrounding the opening thereof to grip and retain the electrically conductive wire member, and complementary assembly means of said body means and said contact means serving to secure said part together, said assembly means including means serving to impart a reactive force against said second portion in a direction substantially normal thereto for aiding in maintaining said electrical contact means and said body means in operative relationship.

2. A contact assembly comprising body means made of thermoplastic insulating material including means for fixedly mounting the contact assembly to a support structure, an upstanding integral ear extending from said body means and having a passageway formed therein extending substantially transverse to said upstanding ear, electrical contact means mounted on said body means and including first and second spring fingers integrally joined at one end, said first spring finger having its free end adapted to be positioned in close proximity to an electrically conductive actuator, said second spring finger having at least a portion thereof lying above the passageway formed in said upstanding ear and being provided with an aperture in said upwardly spaced portion for accepting said upstanding ear, the upwardly spaced portion of said second spring finger capable of being deflected below the passageway formed in said upstanding ear to enable marginal portions surrounding the second spring finger aperture to grip and retain a wire positioned therein, and assembly means for securing the electrical contact means and body means together including means serving to impart a reactive force against said second spring finger in a direction substantially normal thereto for aiding in maintaining said electrical contact means and said body means in operative relationship.

3. A contact assembly comprising, in combination, a support including a panel, body means made of thermoplastic insulating material having a pair of opposed deflectable panel engaging prongs extending from one face of said body means, the maximum distance between said prongs prior to the deflection thereof being less than a panel strip portion adapted to spread said prongs during assembly therewith to cause said prongs to grip said panel strip portion, a wire receiving member extending from said body means in a direction opposite to said panel engaging prongs and having a passageway extending substantially transverse to said upstanding ear for receiving an electrically conductive wire member, electrical contact means mounted on said body means and having first and second portions, said first portion having one end thereof positioned in close proximity to an electrically conductive actuator for engagement thereby, said second portion being normally resiliently spaced upwardly from said first portion and having an aperture aligned with and slightly larger than the wire receiving member of said body means for accepting the same therein, said second portion being positioned beneath the passageway of said wire receiving member prior to the insertion of an electrically conductive wire member therein to enable marginal portions surrounding the aperture of said second portion to grip and retain said wire when released to its normal position, and assembly means for releasably securing the electrical contact means and body means together including means serving to impart a reactive force against said second portion in a direction substantially normal thereto for aiding in maintaining the components in operative relationship.

4. The contact assembly as defined in claim 2 wherein the means imparting a reactive force substantially normal to said second spring finger comprises a resilient tab extending from a marginal area of the aperture formed in said second spring finger and offset from the upwardly spaced portion thereof by an angle of 10–14°, said resilient tab cooperating with an overhanging ledge associated with said upstanding ear to prevent separation of said electrical contact means from said body means.

5. The contact assembly as defined in claim 2 wherein said means imparting a reactive force substantially normal to said second spring finger comprises a pair of resilient tabs extending from opposed marginal areas surrounding the aperture formed in said second spring finger, the distance between said tabs at their free ends being less than a transverse dimension of said upstanding ear and adapted to be forced thereover and received within the passageway of said upstanding ear.

6. The contact assembly as defined in claim 2 wherein the means for imparting a reactive force substantially normal to said second spring finger comprises at least one boss formed on said switch body means and extending in the same direction as said upstanding ear, said boss being provided with an undercut shoulder having an outer peripheral margin greater than a complementary shaped recess formed in said electrical contact means.

7. The contact assembly as defined in claim 6 wherein the complementary shaped recess is defined by the spacing between said first and second spring fingers.

8. The contact assembly as defined in claim 6 wherein the complementary shaped recess is formed in at least one of said spring fingers.

9. The switch as defined in claim 2 wherein the means imparting a reactive force substantially normal to said second spring finver comprises a U-shaped member formed on said body means and extending in the same direction as said upstanding ear, said U-shaped member being capable of receiving a reslient tab extending from said second spring finger.

10. The switch as defined in claim 2 wherein said assembly means further includes connecting means cooperating with the means imparting a reactive force substantially normal to said second spring finger for releasably securing said electrical contact means and said body means in operative relationship.

11. The switch as defined in claim 10 wherein said connecting means comprises a protuberance extending from said body means in the same direction as said upstanding ear and having a reversely curving portion at the free end thereof, said electrical contact means being provided at the end at which said fingers are joiined with an upwardly inclined resilient portion adapted to be deflected below the reversely curing portion of said protuberance to releasably secure the components together.

12. The switch as defined in claim 10 wherein said connecting means further includes a post extending between said body and the reverse curing portion of said protuberance, said post adapted to be received within a notch formed in the upwardly inclined resilient portion of said electrical contact means to resist lateral movement of the components.

13. The switch as defined in claim 10 and further including a lug associated with the upwardly inclined resilient portion of said electrical contact means, and co-operating with a recess formed in said proturberance to resist lateral movement of the components.

14. The switch as defined in claim 2 wherein said means for fixedly mounting the body means to a support comprises a screw threaded faster.

15. The switch as defined in claim 2 wherein said means for fixedly mounting the body means to a support comprises a pair of deflectable panel engaging prongs extending from said switch body means in a direction generally opposite to said wire receiving member, the maximum distance between said prongs prior to the deflection thereof being less than a panel strip portion adapted to spread said prongs during assembly therewith and cause the same to grip said panel strip portion.

16. The switch as defined in claim 15 wherein the electrical contact means is provided with an arm extending substantially normal to at least said first spring finger and having an abutment at the free end thereof extending generally in the same direction as said first and second spring fingers, the arm and its associated abutment adapted to engage one of said panel engaging prongs to maintain them in panel gripping engagement.

17. The switch as defined in claim 2 wherein said second spring finger is provided with a concavo-convex shape throughout a major portion of its length.

18. The switch as defined in claim 2 wherein said body means is provided with an elongated ridge for contacting and resliently biasing at least a portion of said second spring finger above the passageway formed in said upstanding ear.

References Cited by the Examiner
UNITED STATES PATENTS 1,531,841    3/1925    Breitenbach _____ 200—166

ROBERT K. SCHAEFER, *Primary Examiner.*

K. CLAFFY, *Examiner.*

D. SMITH, *Assistant Examiner.*